Jan. 23, 1973   E. H. PHILLIPS ET AL   3,713,013
VOLTAGE CONTROLLED INVERTER CIRCUIT FOR VARIABLE
SUPPLY VOLTAGES AND LOADS
Filed April 12, 1972   10 Sheets-Sheet 1
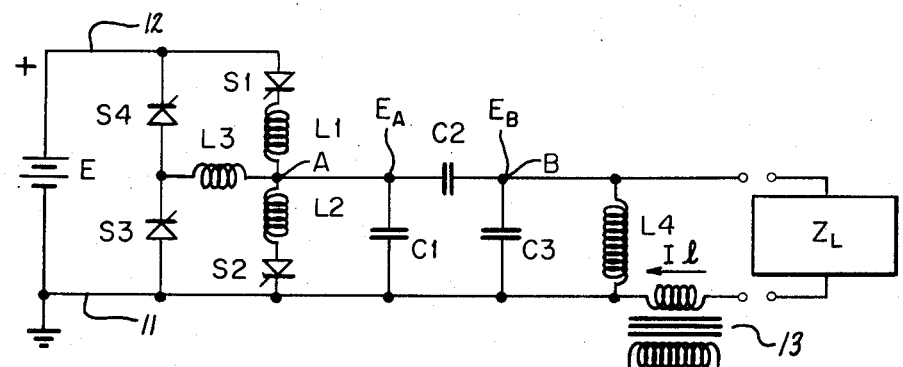
_Fig. 1_
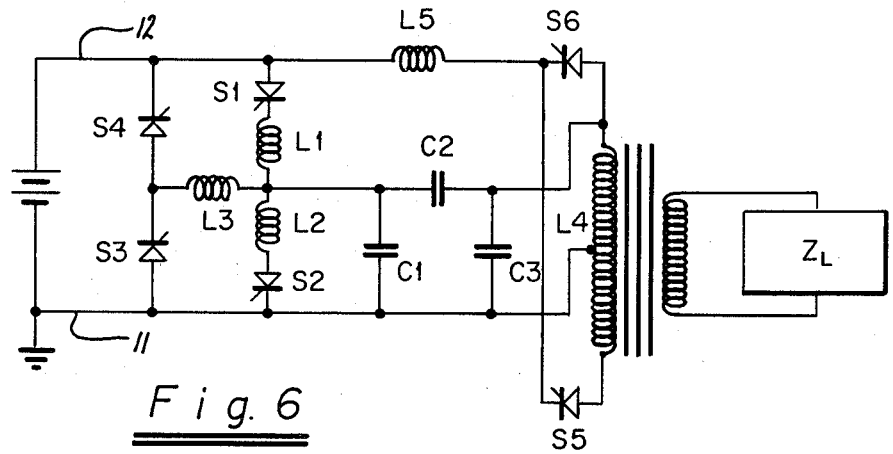
_Fig. 6_
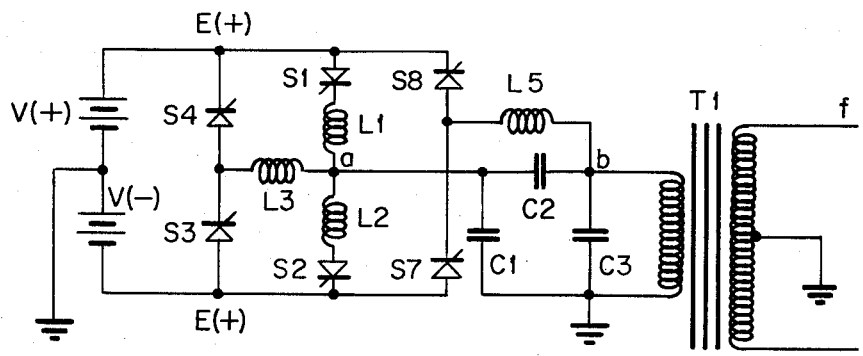
_Fig. 7_

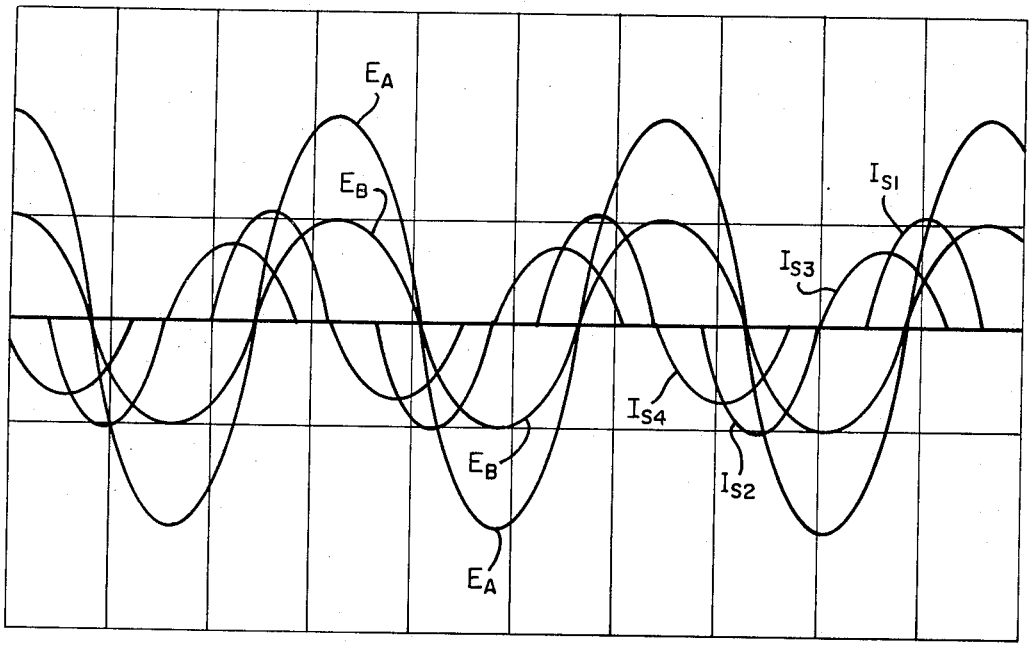
*Fig. 2A* Unloaded
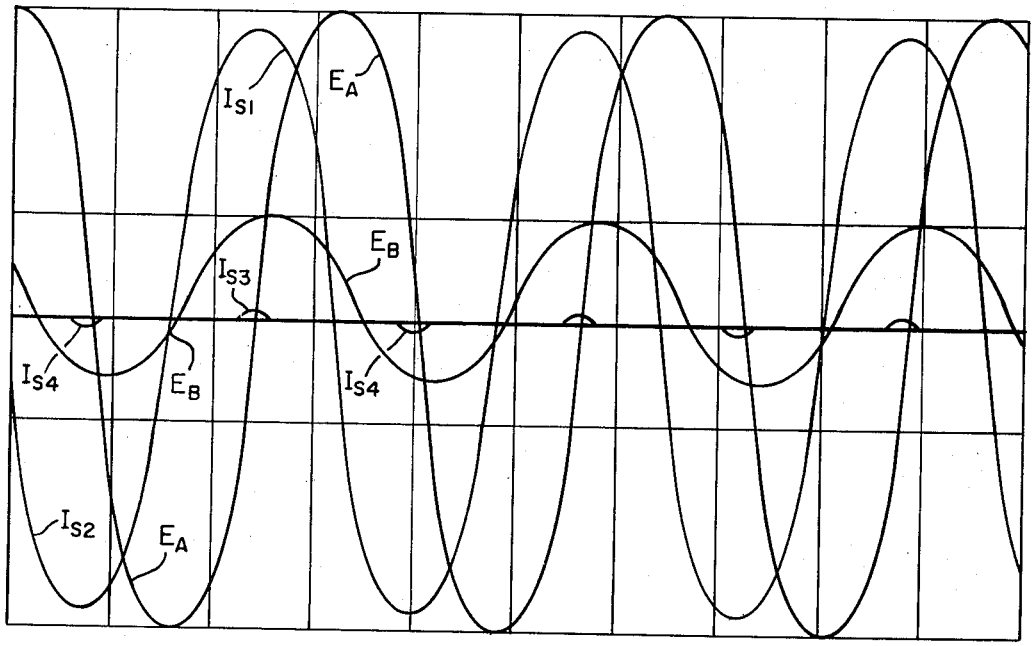
*Fig. 2B* Loaded

Power SCR's
Fig. 3A — Unloaded  E
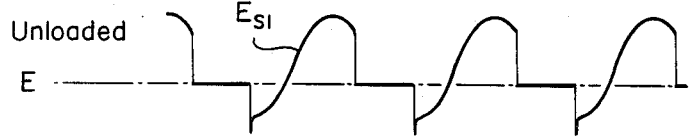
Fig. 3B — I
Fig. 3C — Loaded  E
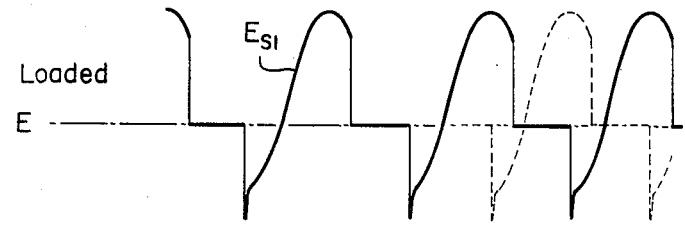
Fig. 3D — I
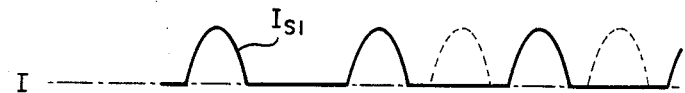
Control SCR's
Fig. 3E — Unloaded  E
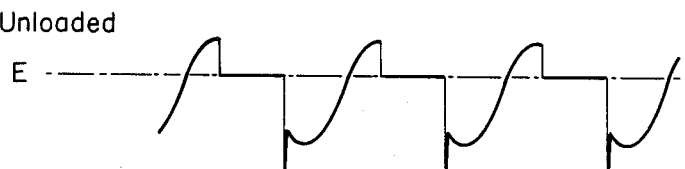
Fig. 3F — I
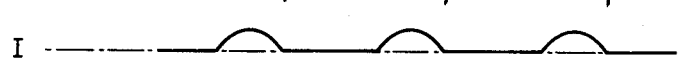
Fig. 3G — Loaded  E
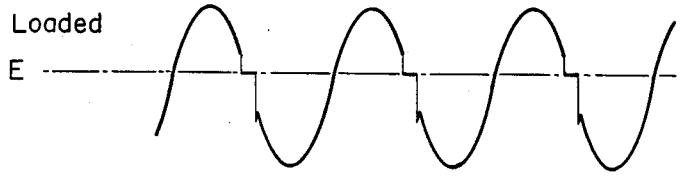
Fig. 3H — I

Fig. 5A  $E_B$
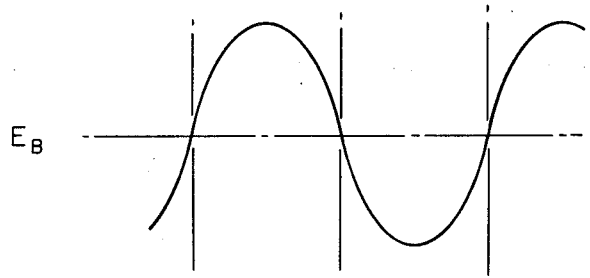
Fig. 5B  $I_L$
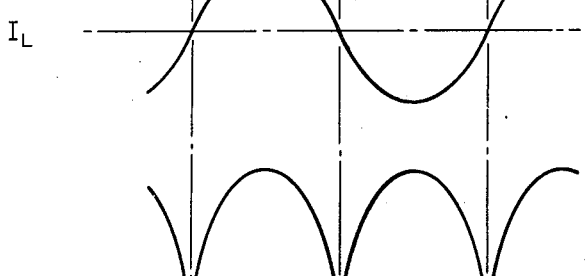
Fig. 5C  $EI$
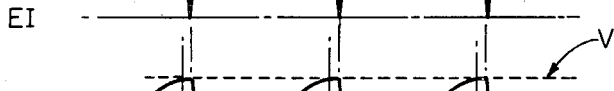
Fig. 5D  $\int EI$
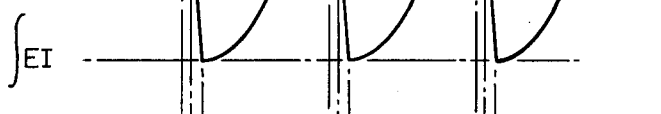
Fig. 5E  $E_R$
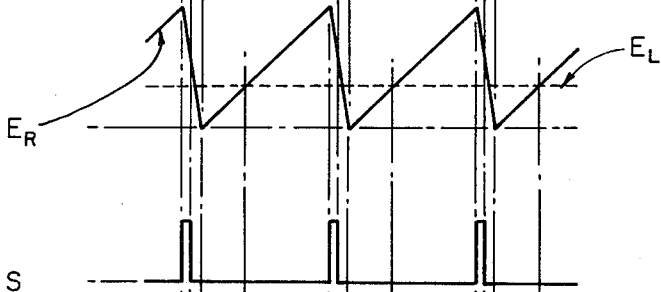
Fig. 5F  S
Fig. 5G  RESET
Fig. 5H  $T_1$
Fig. 5I  $T_2$
Fire 1  Fire 4  Fire 2  Fire 3  Fire 1

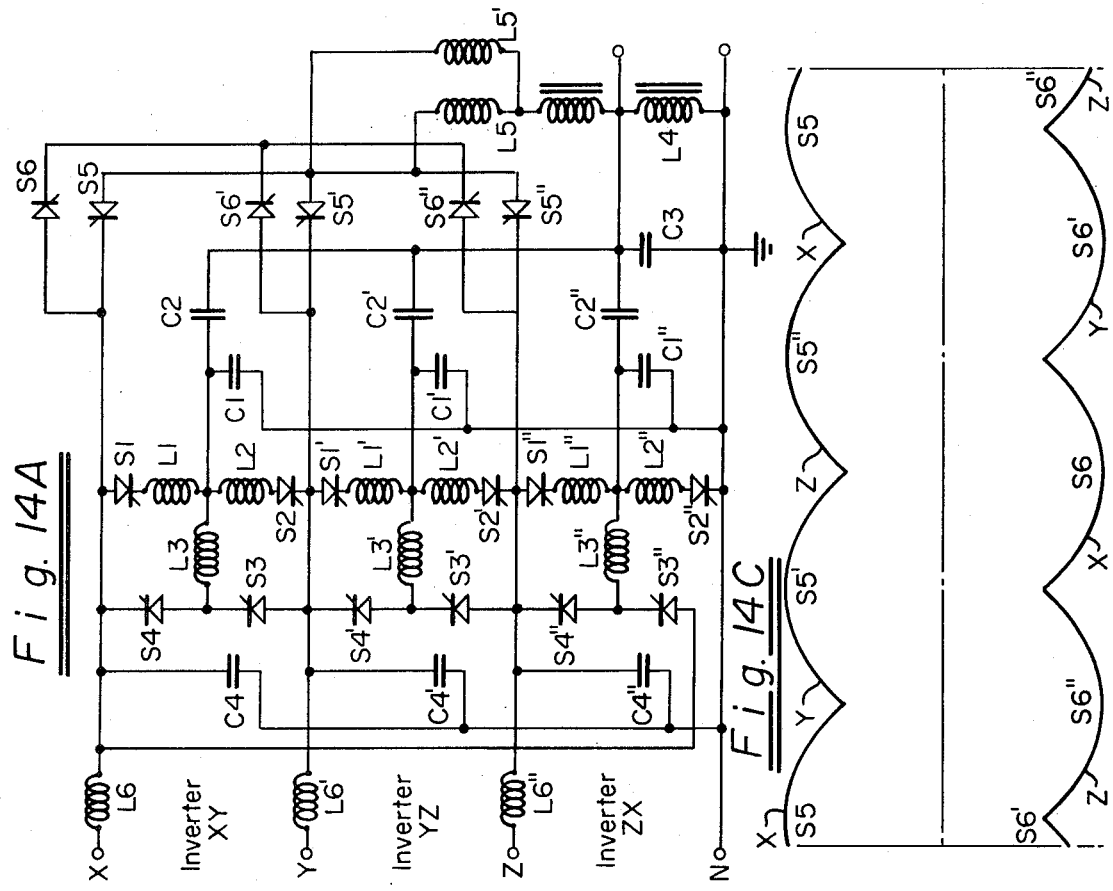
Fig. 14A
Fig. 14C
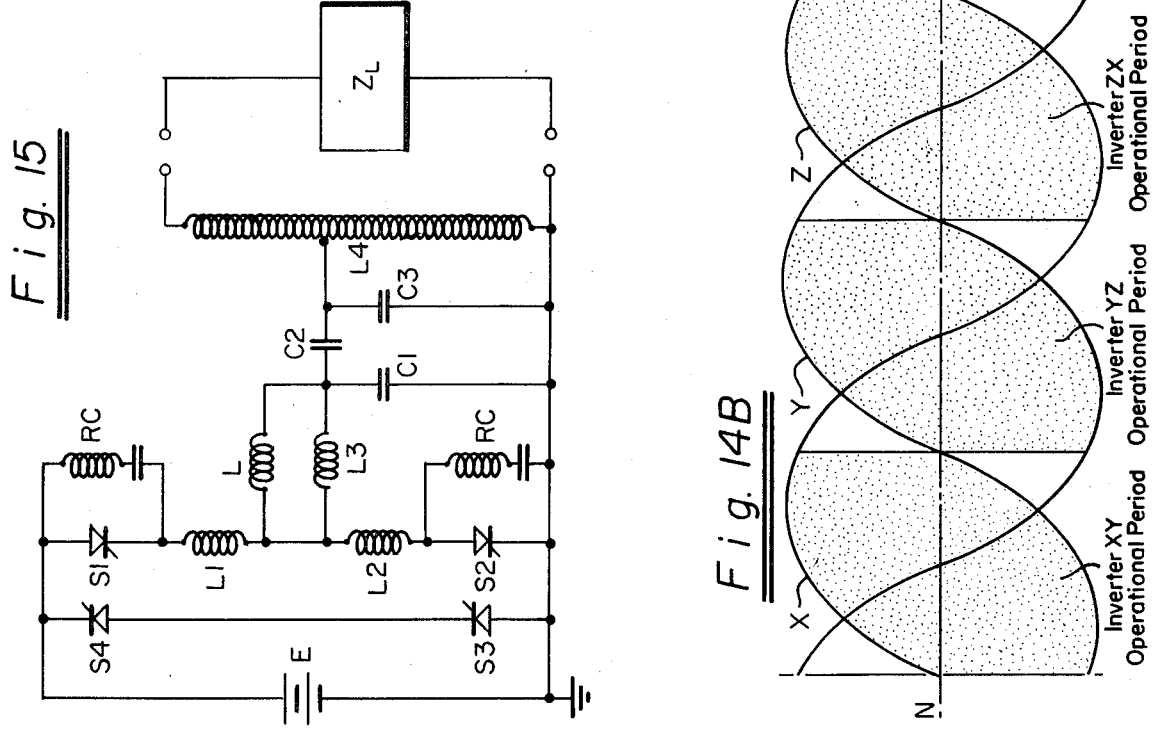
Fig. 15
Fig. 14B

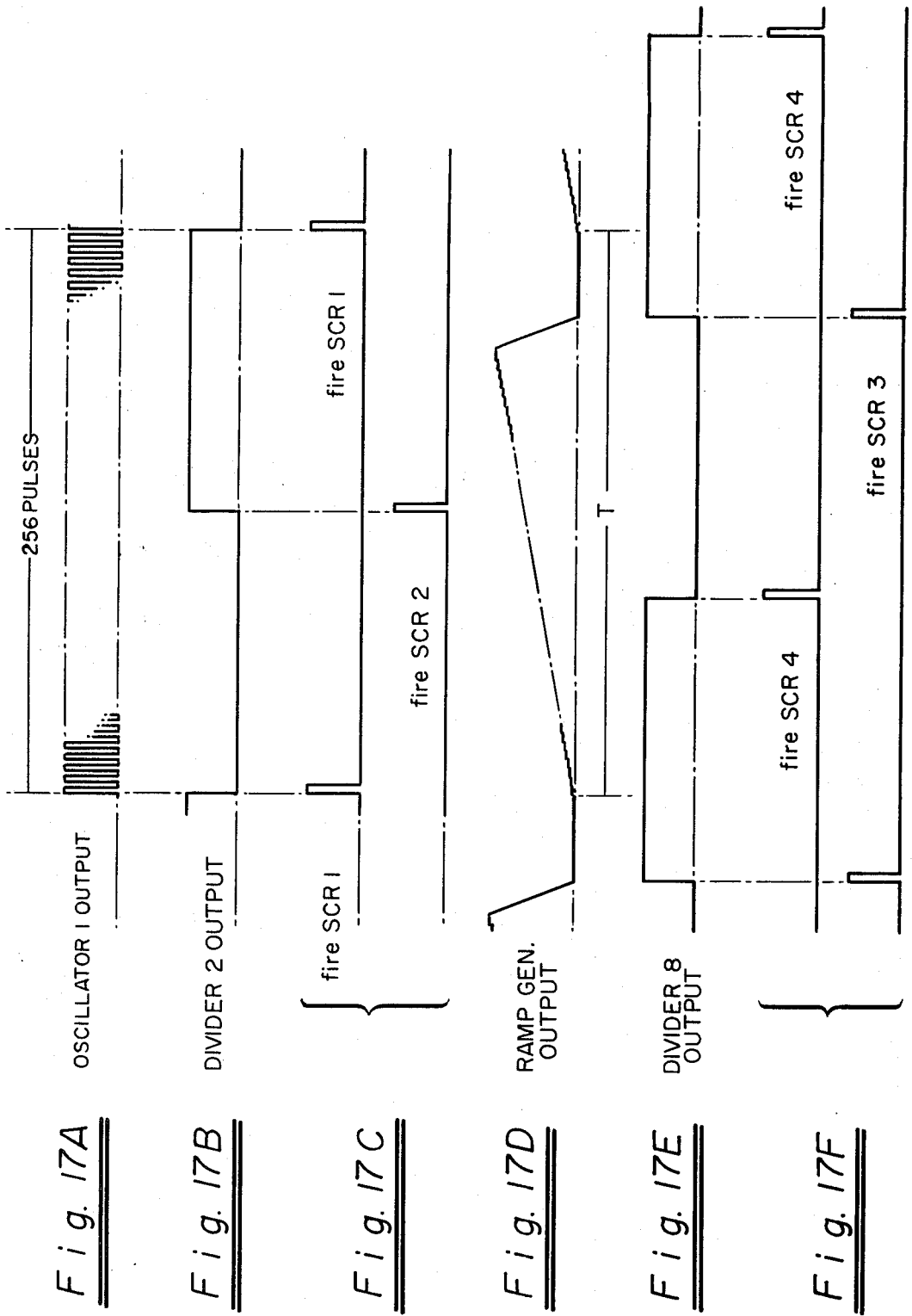

United States Patent Office 3,713,013
Patented Jan. 23, 1973

3,713,013
VOLTAGE CONTROLLED INVERTER CIRCUIT FOR VARIABLE SUPPLY VOLTAGES AND LOADS
Edward H. Phillips, Los Altos, and Raymond D. Underwood, Saratoga, Calif., assignors to Programmed Power, Inc., Menlo Park, Calif.
Filed Apr. 12, 1972, Ser. No. 243,193
Int. Cl. H02m 7/52
U.S. Cl. 321—45 R
10 Claims

ABSTRACT OF THE DISCLOSURE

An inverter circuit includes a pair of power SCR's with inverse parallel connected control SCR's. The firing time of the control SCR's are varied with respect to the power SCR's in accordance with variations in supply voltage and load to allow a greater or lesser oscillatory voltage in the power SCR resonant circuit.

BACKGROUND OF THE INVENTION

The present invention is directed to a voltage controlled inverter circuit for variable D.C. supply voltages and variable loads with inherent fault protection.

Prior inverters, as for example illustrated in the General Electric SCR (Silicon Controlled Rectifier) manual, have not possessed inherent voltage regulation or fault protection. Sine wave inverter types also typically exhibit poor commutation, component utilization and circuit efficiency. Square wave inverters usually exhibit a combination of high commutation pulse and circulating current magnitude or have poor commutation. Typically, they have sharp current rise times and high SCR turn-on power loss. The circuits are, therefore, limited to relatively low frequencies or their relative power output must be severely de-rated.

OBJECTS AND SUMMARY OF THE INVENTION

It is, therefore, a general object of the invention to provide an improved inverter circuit.

It is another object of the invention to provide an inverter circuit that provides a regulated output waveform immune to changes in supply voltage.

It is another object of the invention to provide an inverter circuit that provides a regulated output waveform immune to changes in load.

It is another object of the invention to provide an inverter circuit with inherent fault protection.

It is another object of the invention to provide an inverter circuit having improved natural SCR commutation with maximum reverse voltage turn off time.

It is another object of the invention to provide an inverter circuit with a reasonably low harmonic content sine wave output waveform with vastly improved circuit component utilization.

It is another object of the invention to provide a high frequency inverter with vastly improved circuit efficiency.

It is another object of the invention to provide the gentlest possible SCR operating characteristics in order to maximize SCR life.

In accordance with the above objects an inverter is provided comprising a D.C. power supply having a D.C. voltage output. A pair of power silicon controlled rectifiers (SCR's) are provided for inverting the D.C. voltage. A first resonant circuit of a series resonant nature is coupled to the power SCR's. A pair of control SCR's and second resonant circuit of a series resonant nature are coupled in an inverse parallel manner for controlling the oscillatory voltage of the first resonant circuit during inversion. Timing means trigger the power and control SCR's at the desired output frequency of the inverter. The timing means includes means responsive to the D.C. supply voltage and means responsive to the power delivered to a load coupled to the inverter. Said timing means varies the firing times of the control SCR's to allow for a greater oscillatory voltage at the juncture of the first and second resonant circuits with decreasing supply voltage or increasing load. A third resonant circuit of a parallel resonant nature is capacitively coupled to said juncture and to the load. Said capacitor coupling provides impedance matching, improved inverter power factor, and inherent fault protection.

BRIEF DESCRIPTION OF THE DRAWINGS

FIG. 1 is an inverter circuit embodying the present invention.

FIGS. 2A and 2B are waveforms useful in understanding the present invention.

FIGS. 3A–3H are further waveforms useful in understanding the present invention.

FIGS. 5A–5I are timing diagrams useful in understanding the operation of the circuit of FIG. 4.

FIG. 6 in an inverter circuit additionally embodying full regenerative capability.

FIGS. 7–11 are alternative embodiments of FIG. 6.

FIGS. 14A–14C are circuits and waveforms of an inverter circuit coupled to 3-phase utility power lines.

FIG. 15 is an inverter circuit optimized for low frequency operation.

FIGS. 17A–17F show the timing diagrams useful in understanding the operation of the circuit of FIG. 16.

DETAILED DESCRIPTION OF PREFERRED EMBODIMENTS

Figure 4:
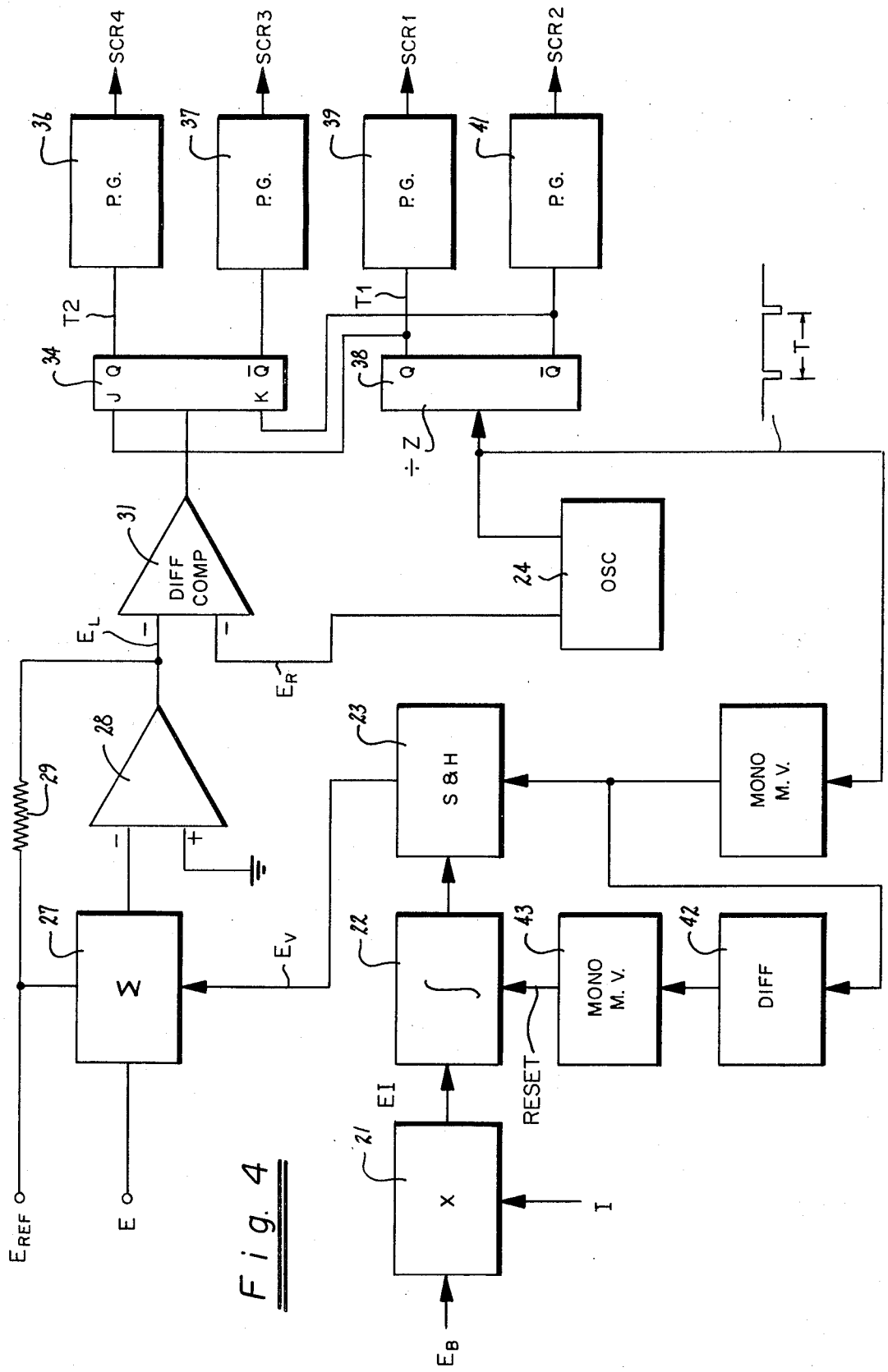
FIG. 4 is a block diagram of a control circuit which is part of the present invention.

Referring now to FIG. 1, the inverter of the present invention includes D.C. or battery source E. The terminals of the source establish a positive (+) supply 12 and neutral 11.

A pair of power silicon controlled rectifiers (SCR's) S1 and S2 are coupled respectively to positive supply 12 and neutral 11 with the anode of S1 being coupled to the positive supply and the cathode of S2 to neutral. Their opposite terminals are coupled through inductors L1 and L2 to a voltage point designated A which, in turn, is coupled through capacitors C1, C2 and C3 and inductor L4 to neutral 11. L1 or L2 alternately and C1, C2 and C3 and L4 form a first resonant circuit which produces an oscillatory voltage $E_A$.

A pair of control SCR's, S3 and S4, are inversely coupled respectively to neutral 11 and positive supply 12 with the anode of S3 being coupled to neutral and the cathode of S4 to the positive supply. Their opposite terminals are tied together and coupled through inductor L3 to voltage point A. L3 and C1, C2 and C3 and L4 form a second resonant circuit which controls the oscillatory voltage $E_A$ by regeneratively returning excess energy at A to source E.

The load, $Z_L$, is coupled to a third resonant circuit formed by the parallel combination of L4 and C3, C1 and C2 at a voltage point designated B. Voltage point B is coupled to driving voltage point A by coupling capacitor C2.

The proper operation of the second resonant circuit (L3, L4, C1, C2, C3) is defined as that which results in a suitably regulated oscillatory voltage $E_B$ immune to changes in the supply voltage E or the load impedance $Z_L$ so long as they are both within the inverter's ratings as follows:

$$E_{B_{rms}} \leq E \leq 2E_{R_{rms}}$$

$$|Z_L|_{min} = |Z_{C3}| \geq \frac{1}{2}|Z_{L4}|$$

where:

$$L1 = L2 = \frac{1}{2}L4$$

$$L3 \approx .72L4$$

and:

$$C1 = C2 = \frac{1}{2}C3$$

The combined operation of the three resonant circuits is quite complex. The circuit component values may be selected by experiment. In general, however, the combined operation of the first and second resonant circuits is at a natural frequency above the inverter frequency while the third resonant circuit has a natural frequency below the inverter frequency.

Referring now again to FIG. 1, the simplified operation of the circuit is substantially as follows:

Initially voltage $E_A$ is equal to $E/2$ as S1 is triggered by the control circuit. $E_A$ will ring sinusoidally to a voltage above that of positive supply 12. S2 is triggered by a control circuit at a time equal to a half period. The voltage at point A will have been influenced by the load impedance, but will in general be greater than $E/2$ when S2 is triggered. This means that voltage $E_A$ will now ring sinusoidally to a voltage below that of neutral 11. Further, it may be seen that the magnitude of the second oscillation is greater than the first since the voltage potential between $E_A$ and neutral 11 was greater when S2 was fired than the voltage potential between positive supply 12 and $E_A$ when S1 was fired initially. Thus, the oscillatory voltage $E_A$ will increase further as S1 and S2 are fired successively at the beginning of each period and at each half period respectively. The voltage $E_A$ and $E_B$ will be limited only by the power coupled through C2 to the load $Z_L$ and the power lost in the various circuit components. Regulation of $E_B$ may be obtained by triggering S3 and S4 in an appropriate manner to regeneratively couple a portion of the energy in the first resonant circuit into the source E of each cycle.

The triggering time for S4 may be defined as a decimal fraction of a complete period and similarly for S3 as the same decimal fraction of a complete period between half periods. Meaningful regulation has been obtained experimentally at control SCR triggering times between .25 and .60. (See FIGS. 2A and 2B.)

Detailed operation of the complete circuit is as follows: S1 is triggered when $E_A$ is at a voltage less than $E/2$. The driving voltage potential on the first resonant circuit when S1 is triggered is $E-E_A > E/2$ and voltage $E_A$ therefore rings sinusoidally to a voltage greater than E. If the control SCR triggering time is less than .50, S4 is the next SCR to be triggered. Generally within the design triggering time range (above) $E_A$ will be greater than E when S4 is triggered and S4 will conduct. The driving voltage potential on the second resonant circuit when S4 is triggered is $E_A - E > 0$ and voltage $E_A$ therefore rings sinusoidally toward a voltage less than E. The current conducted by S4 is conducted through positive supply 12 to source E. Thus, a portion of the energy in the first resonant circuit is regeneratively returned to source E each cycle from neutral 11 through C1, C2, C3, L4, L3 (the second resonant circuit) and S4 to positive supply 12. S2 is triggered precisely at a half period. $E_A$ is larger than $E/2$ at this time. The driving voltage potential on the first resonant circuit is now $E_A - 0 > E/2$ and voltage $E_A$ therefore rings sinusoidally to a voltage less than zero. Assuming the control SCR triggering time remains less than .50, S3 is the next SCR to be triggered. Analogously to the triggering time of S4, S3 goes into conduction with the driving voltage potential on the second resonant circuit equal to $0 - E_A > 0$ and voltage $E_A$ therefore rings sinusoidally toward a voltage greater than zero. Thus, a portion of the energy in the first resonant circuit is stored within the other resonant circuits to be returned to source E when S4 is in conduction ½ period later. Operation with control SCR triggering times from .50 through .60 proceeds in the same manner except that the control SCR's S3 and S4, are triggered later and, therefore, remove less energy from the first resonant circuit.

For constant supply voltage, load impedance and control of SCR triggering time it may be seen that such continuous oscillations of $E_A$ are symmetrical about $E_A = E/2$. In operation, the lower the decimal fraction is, the more power is removed from A, the less power is injected into A (because the driving voltage potential on the first resonant circuit is reduced), and the lower is the oscillatory voltage $E_A$ and, therefore, the voltage driving potential upon coupling capacitor C2.

The action of coupling capacitor C2 may now be fully appreciated. Sizing this component at an impedance level greater than the minimum design load impedance has allowed a selected decoupling between $E_A$ and $E_B$.

Decreasing the load impedance requires $E_A$ to increase and, therefore, increase the stored energy available in the first resonant circuit to drive such a greater load. The effect is to dynamically match the inverter impedance to the load impedance and minimize circulating reactive energy for all loads. This action may be observed in FIGS. 2A and 2B which compare $E_A$ and $E_B$ with the SCR currents for the unloaded and loaded cases respectively. Since the load seen by $E_A$ is capacitive and the load seen by $E_B$ is resistive for maximum load ($|Z_L|$ min.), there is also a phase shift of $E_B$ forward tending to come into phase with the power SCR currents. Thus, the inverter power factor tends to approach 1.0, the most efficient possible operating point for maximum loads. Additionally, excess loading (fault condition) is accommodated by the blocking action of C2 which may also be regarded as an extreme example of the circuit's impedance matching capability. Finally, C2 also acts as a D.C. blocking capacitor allowing an offset supply voltage to be used and eliminating the typical requirement for a center tapped D.C. supply.

The third resonant circuit is necessary to stabilize the output voltage, $E_B$, and to provide a ready source of stored energy for a dynamically changing load. Additionally, the preponderantly capacitive impedance of this circuit allows coupling capacitor C2 to most effectively perform its basic function of impedance matching as discussed above.

FIGS. 3A through 3H illustrate the typical voltage across and current waveforms through for both the power and control SCR's with the inverter both unloaded and loaded.

SCR CONTROL CIRCUIT OPERATION

FIG. 4 along with the waveforms of FIGS. 5A–5I illustrate the control circuit for firing SCR's 1, 2, 3 and 4. This circuit essentially senses the power delivered to the load by means of monitoring the voltage $E_B$ and the current $I_L$ through the current transformer 13 (FIG. 1). These are multiplied together in multiplier 21 to produce a signal E1 which is proportional to the instantaneous power delivered to the load. This signal is shown in FIG. 5C along with the voltage $E_B$ and current $I_L$ waveforms in FIGS. 5A and 5B. An integrating unit 22 produces the integral of EI which is then sampled and held by a sample and hold unit 23. The sampling time is determined by an input voltage S shown in FIG. 5F. This frequency is twice the basic operating frequency of the inverter and is derived from a stable oscillator 24. Immediately following the sampling interval, monostable multivibrator 43 generates a reset pulse which resets the output of integrator 22 to zero. This reset pulse is shown in FIG. 5G. The resulting output of sample and hold circuit 23 is, therefore, a voltage $E_V$ which is proportional to the power delivered to the load during each half cycle of inverter operation. This output is coupled as an input to summing network 27 which has as other inputs a voltage $E_{reference}$ and the D.C. source voltage E. This is coupled to a grounded amplifier 28 which has feedback resistance 29 across it. The output of amplifier 28, $E_L$, is thus a voltage level which is related to the power delivered to the load and also to the D.C. supply voltage. $E_L$ is coupled to one input of the differential comparator 31. The remaining input to the comparator is a sawtooth voltage produced by oscillator 24 and shown in FIG. 5E. The operation of the comparator is such that a negative voltage transition occurs as sawtooth voltage $E_R$ rises positive with respect to $E_L$. These negative transitions drive J-K flip-flop 34 to produce the waveform T2 as shown in FIG. 5I. Thus, it is apparent that variation of $E_L$ (which might be caused by a decrease or increase in either the load power or supply voltage) will cause the firing times of SCR's 3 and 4 to change with either a greater or lesser phase angle with respect to SCR's 1 and 4. The firing times of SCR's 1 and 2 are determined by the basic clock frequency produced by oscillator 24 after being divided by two by the flip-flop unit 38. This produces on its Q output the timing waveform T1 as shown in FIG. 5H which is coupled to SCR1 and the $\bar{Q}$ output of flip-flop 38 drives the pulse generator 41 coupled to SCR2.

From the foregoing operation of the control circuit the operation of the present invention in shifting the firing of SCR's 3 and 4 as illustrated in FIGS. 5I and 5H with variations in the load, it is quite apparent that this change of phase angle allows a higher ring-up of the output voltage $E_A$ to compensate for changes in supply voltage E or power requirements.

ALTERNATIVE EMBODIMENTS

Many variations of the invention are possible and FIGS. 6 through 15 illustrate some of them.

FIG. 6 illustrates additional regenerative SCR's S5 and S6 coupling autotransformer extensions of L4 to L5 and through L5 to positive supply 12 in the manner of a full wave battery charger. These SCR's may be necessary for some applications since coupling capacitor C2 acts as an impedance matching device in the regenerative power flow direction and also effectively limits regenerative power handling capability. Such autotransformer taps and inductor L5 may be sized to handle any desired level of regenerative power. FIG. 6 also illustrates the use of L4 as the primary of an isolation transformer to supply power load $Z_L$. For this case, the design of the transformer is straight forward with the additional requirement that the magnetizing inductance be sized to fulfill the L4 requirement.

FIG. 7 illustrates the use of an optional center tapped D.C. supply and two half wave regenerative SCR's S7 and S8.

Figure 8:
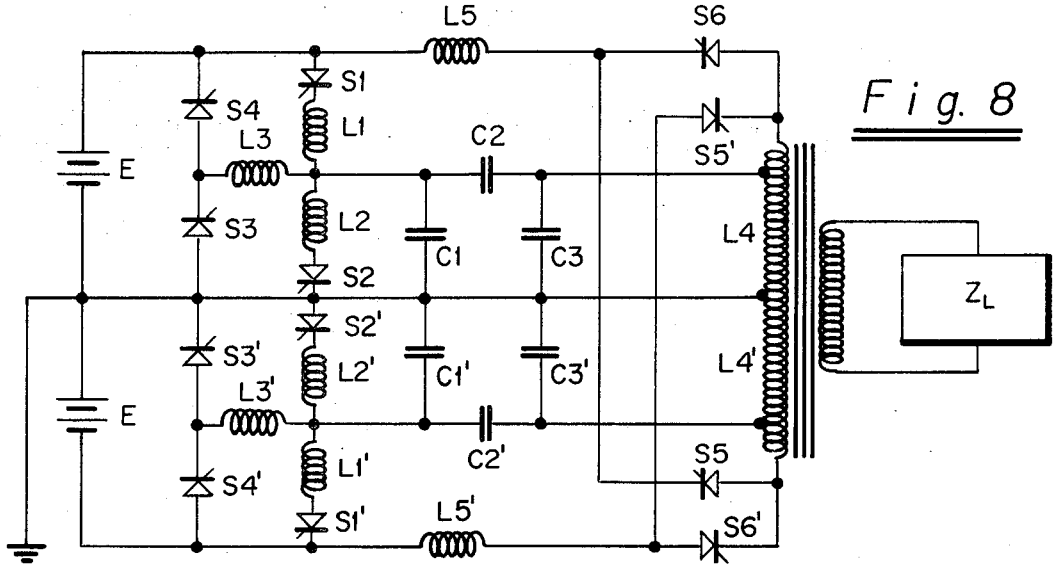

FIG. 8 illustrates symmetrical inverters similar to the inverter illustrated in FIG. 6 and operated with a center tapped supply in a full wave manner. It is useful for higher supply voltages and/or higher power levels.

Figure 9:
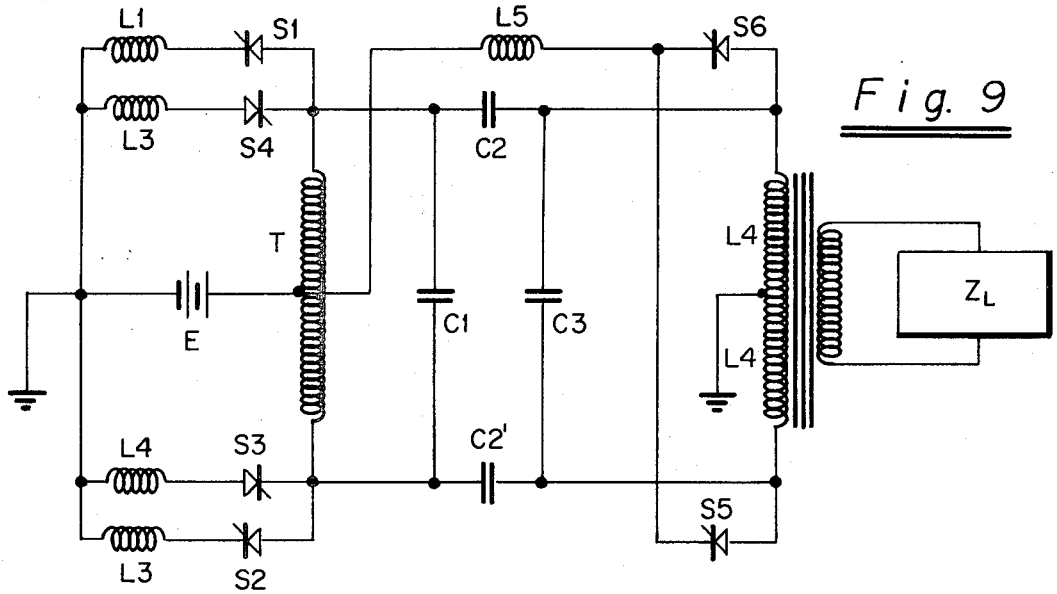

FIG. 9 illustrates a center tapped transformer version of the inverter. The additional transformer T is required because of the D.C. blocking action of C2 and C2'. This version of the inverter is useful at very low D.C. supply voltage because it cuts the SCR currents and losses in half and is preferable where such losses predominate.

Figure 10:
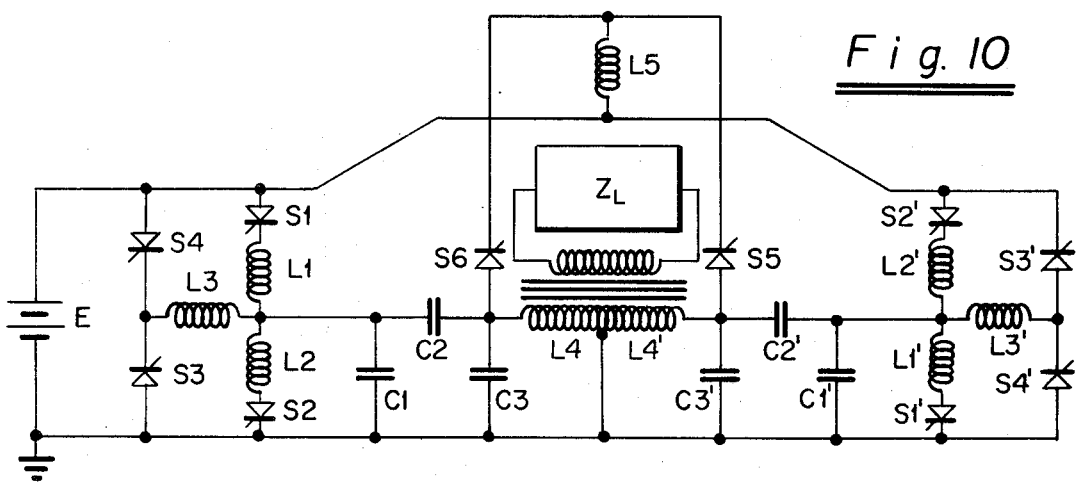
Figure 11:
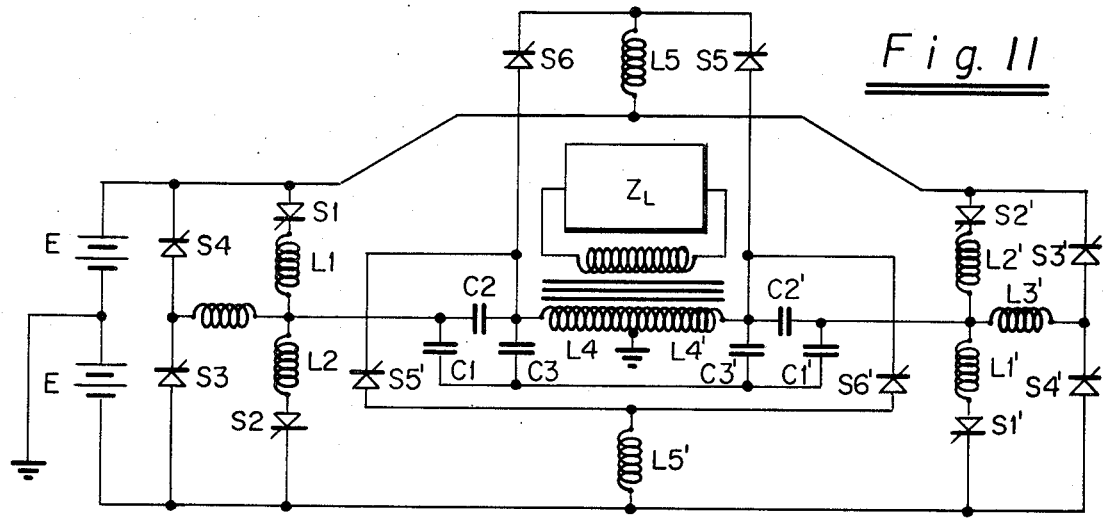

FIGS. 10 and 11 are full bridge configurations of the inverters shown in FIGS. 6 and 7 respectively and are useful for higher power levels.

Figure 12:
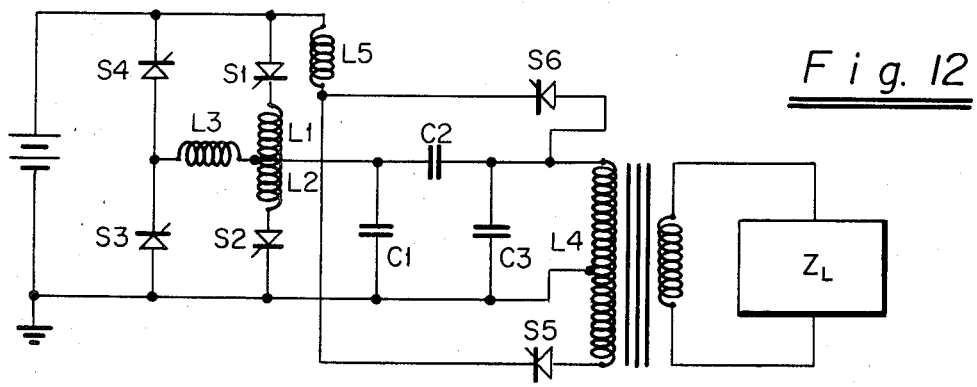
FIGS. 12 and 13 are inverter circuits additionally embodying force commutated power SCR's.
Figure 13:
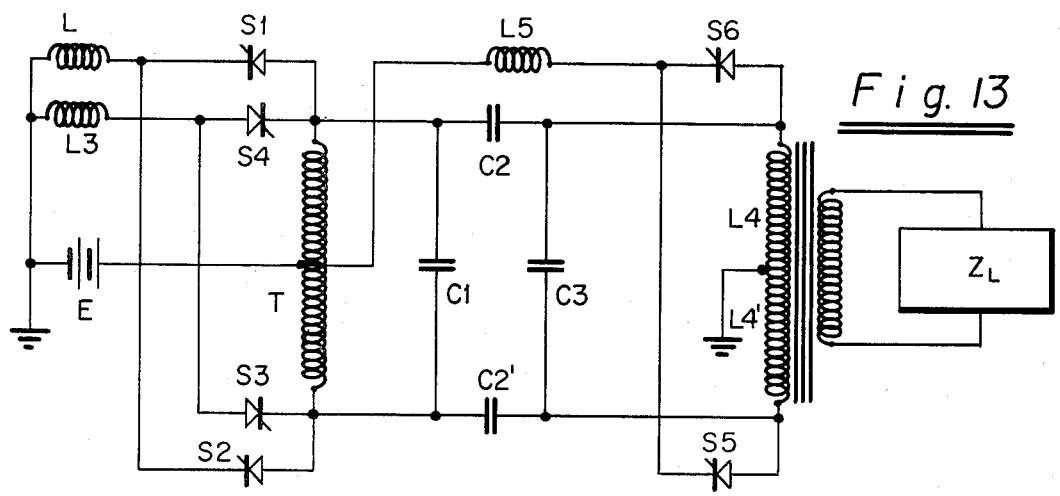

Forced commutation is available by coupling inductors L1 and L2 magnetically as shown in FIG. 12. Forced commutation is either full bridge or center tapped transformer versions may also be obtained by replacing L1 and L2 with a single inductor L as shown in FIG. 13.

FIG. 14A illustrates a method of deriving fully regenerative high frequency power directly from low frequency company utility lines without an intermediate D.C. link. Three inverters XY, YZ and ZX are operated sequentially as illustrated in FIG. 14B. If the utility supply is 208v. AC 3 phase, each inverter's drive voltage varies from 147 to 294 to 147 volts D.C. during its operational period. Regenerative SCR's S5, S5', S5'', S6, S6' and S6'' are also operated sequentially but during slightly different periods as illustrated by FIG. 14C. Additionally, C4, C4', C4'', L6, L6' and L6'' may be required to protect the line from high frequency distortion.

ALTERNATE EMBODIMENT OF SCR CONTROL CIRCUIT

Figure 16:
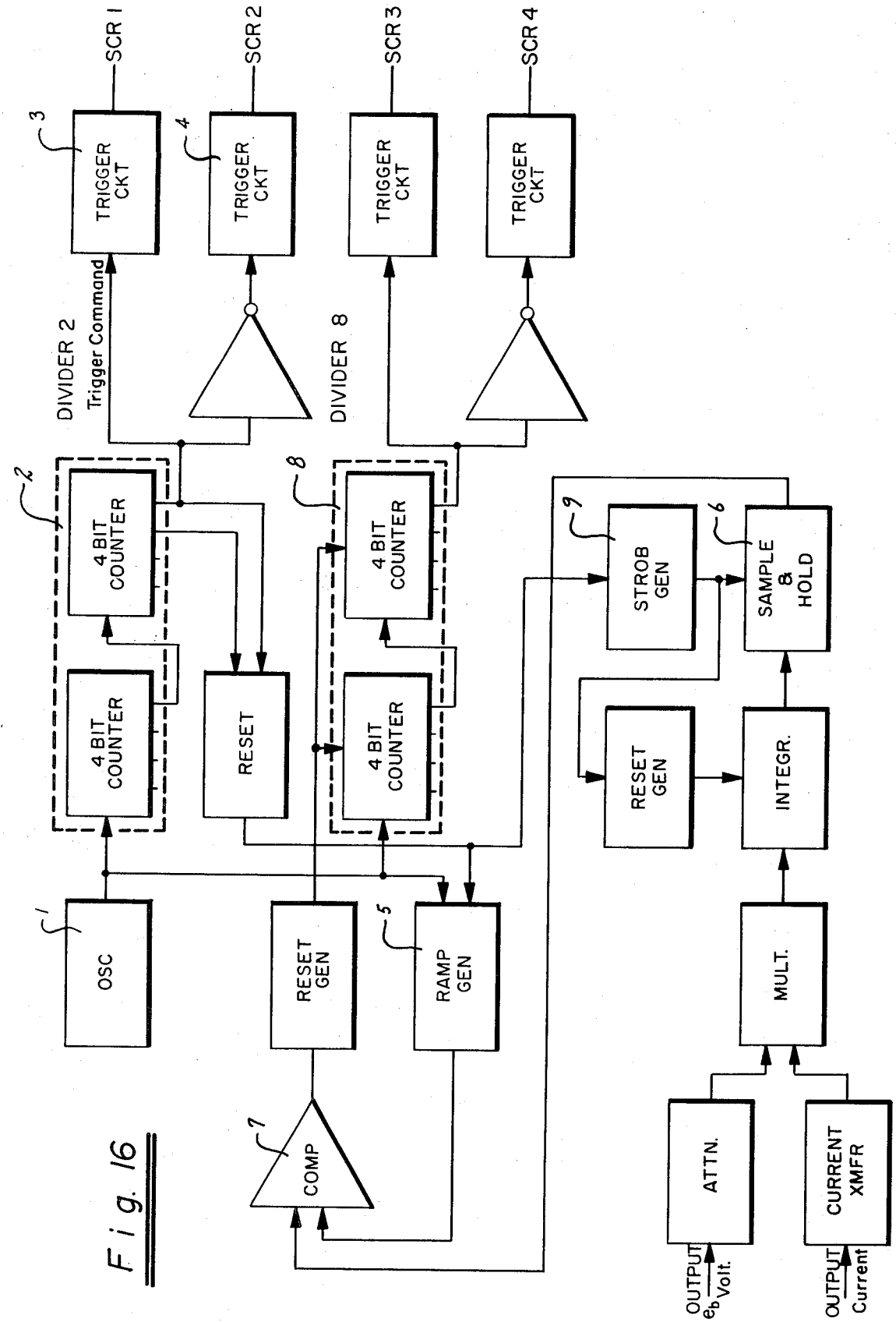
FIG. 16 is a block diagram of another control circuit.

FIG. 16 is another embodiment of the control circuitry. With this circuit, the firing delay of SCR's 3 and 4 may be between 0 and 75% of the firing period.

In this circuit, an oscillator 1 runs at $2^8$ times the desired inverter output frequency. Divider 2, a binary counter, divides the oscillator frequency and provides a trigger command to trigger circuit 3 at each count of $2^8$. SCR1 is thus triggered by circuit 3 once every 256 cycles of oscillator 1. Trigger circuit 4 receives an inverted trigger command from divider 2. SCR2 is thereby triggered at the same rate as SCR1, but delayed by 128 cycles of oscillator 1. FIGS. 17A, B and C show these relationships.

Oscillator 1 also drives a ramp generator circuit 5 to produce a linearly increasing "staircase" voltage. This voltage is compared to the output of a sample and hold circuit 6 by comparator 7 in a manner similar to that previously described.

A third output of oscillator 1 drives divider 8, a binary counter identical to divider 2. Divider 8 is reset to a count of zero each time the ramp generator output passes positively through the output level of sample and hold circuit 6. By this means, the output square wave of divider 8 varies in phase with respect to divider 2 by an amount determined by the comparison of the sample and hold voltage output and the ramp generator output. Divider 8 fires SCR's 3 and 4 exactly as divider 2 fires SCR's 1 and 2. Divider 2 also provides the necessary signals to reset the ramp generator and strobe generator 9 as previously discussed.

The objects of the invention have been so effectively met that the inverter may be practically adapted for use at low frequencies such as 60 Hz. where it can compete favorably with ferro-resonant inverters. The predominate magnetic devices, costwise, are L1 and L2. Their first resonant circuit function may be largely assumed by inductor L of FIG. 15. It is not possible to totally eliminate L1 and L2, however, since they are now part of a $dV/dt$ protection circuit required to avoid involuntary firing of one power SCR when the other is triggered. L1 and L2 may be magnetically linked in order to increase their effectiveness in this regard, however. Inductor L is physically smaller than the combination of the portions of L1 and L2 that it replaces, since the RMS or heating value of the full wave current conducted by L is only 2 times the half wave current conducted by L1 and L2, and the resulting device is similarly related in weight.

Generally, similar though considerably reduced RC "snubbers" must be provided for all SCR's of all the inverter circuits illustrated because of the non-zero reverse recovery time characteristics of the SCR's. The effect of this characteristic may be seen in FIGS. 3A, 3C, 3E and 3G. Upon self-commutation the inductor SCR sets are subjected to an immediate reverse voltage. The SCR's do not immediately recover their reverse blocking capability but conduct in the reverse direction for a small amount of time such as a few microseconds. During this time a small amount of inductive current builds in the reverse direction. The SCR's recover their reverse blocking capability abruptly in a manner analogous to snap diodes and an inductive voltage kick results. This stored energy must be partially dissipated to limit the magnitude of the reverse voltage placed across the SCR. The allowed negative voltage overshoot immediately following turn-off is self-evident in the foregoing figures.

What is claimed is:

1. An inverter comprising: a D.C. power supply having a D.C. voltage output; a pair of power silicon controlled rectifier (SCR's) for inverting said D.C. voltage; a first resonant circuit coupled to said power SCR's; a pair of control SCR's inverse parallel coupled to said power SCR's and second resonant circuit for controlling the oscillatory voltage output of the first resonant circuit; and timing means for triggering said power and control SCR's at a predetermined frequency, said timing means including means for pre-selecting the triggering times for the control SCR's relative to the power SCR's.

2. An inverter as in claim 1 where said first resonant circuit has a natural frequency greater than said predetermined frequency to allow for proper natural commutation of said power SCR's.

3. An inverter as in claim 1 where said first and second resonant circuits are coupled to a load and drive said load with oscillatory voltage at said predetermined frequency.

4. An inverter as in claim 3 where said resonant circuits include a capacitor series connected to said load for selectively decoupling said load from said inverter.

5. An inverter as in claim 4 together with a third resonant circuit coupled to said load for stabilizing said oscillatory load voltage.

6. An inverter as in claim 1 where said first resonant circuit includes magnetic coupling means enabling forced communication of said power SCR's.

7. An inverter as in claim 1 where said timing means includes means responsive to the level of said D.C. voltage for varying said control SCR's triggering times for maintaining said oscillatory voltage constant and therefore immune to variations in said D.C. voltage.

8. An inverter as in claim 3 where said timing means includes means responsive to the power delivered to said load for varying said control SCR's triggering times for maintaining said oscillatory voltage constant and therefore immune to variations of said load.

9. An inverter comprising: a D.C. power supply having a D.C. voltage output; a pair of power silicon controlled rectifiers (SCR's) for inverting said D.C. voltage; a first series resonant circuit coupled to said power SCR's; a pair of control SCR's inverse parallel coupled to said power SCR's and a second series resonant circuit coupled to said first resonant circuit for controlling the oscillatory voltage of said first resonant circuit during inversion; timing means for triggering said power and control SCR's at a predetermined frequency, said timing means being responsive to said D.C. voltage and power delivered to a load coupled to said inverter for varying the firing times of said control SCR's to allow for a greater oscillatory voltage at the juncture of said first and second resonant circuits with decreasing D.C. supply voltage or increasing load; and a third parallel resonant circuit including capacitor means for coupling said juncture to said load.

10. In a control circuit for an inverter having a pair of power silicon controlled rectifiers (SCR's) and a pair of control SCR's inverse parallel coupled to said power SCR's and resonant circuit means for producing an oscillatory voltage which is coupled to a load said control circuit including means for triggering said SCR's at a predetermined frequency and means responsive to the power delivered to the load for varying said control SCR's triggering times for maintaining said oscillatory voltage constant.

References Cited

UNITED STATES PATENTS

| | | | |
|---|---|---|---|
| 3,207,974 | 9/1965 | McMurray | 307—305 X |
| 3,242,352 | 3/1966 | Long | 321—45 C |
| 3,315,144 | 4/1967 | Poss | 321—45 R X |
| 3,406,326 | 10/1968 | Stemmler | 321—43 |
| 3,452,266 | 6/1969 | Borden et al. | 321—43 X |
| 3,474,320 | 10/1969 | Chandler | 321—45 R X |
| 3,487,278 | 12/1969 | Turnbull et al. | 321—45 C |
| 3,599,078 | 8/1971 | Pelly et al. | 321—45 C X |

WILLIAM M. SHOOP, Jr., Primary Examiner

U.S. Cl. X.R.

321—45 C